Figure 7:
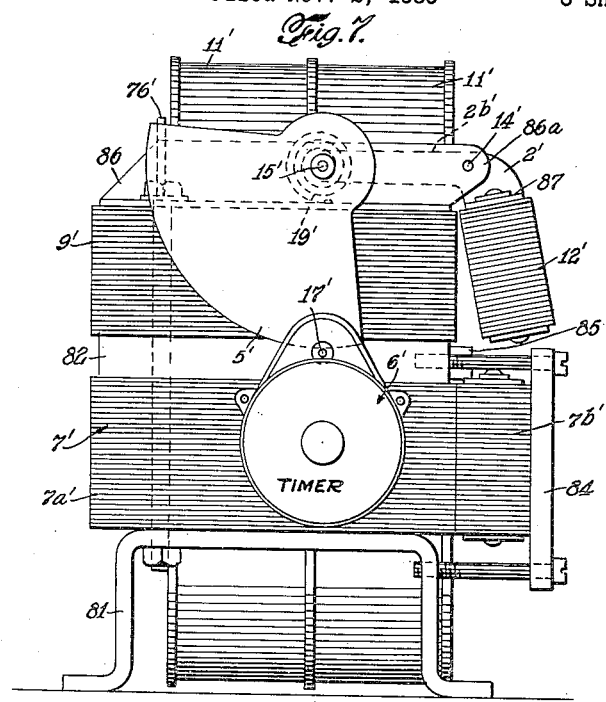

April 8, 1941.  J. TYRNER  2,237,894
AUTOMATIC CONTROL APPARATUS FOR DIRECT-CURRENT ARC WELDING
Filed Nov. 2, 1939　　6 Sheets-Sheet 1
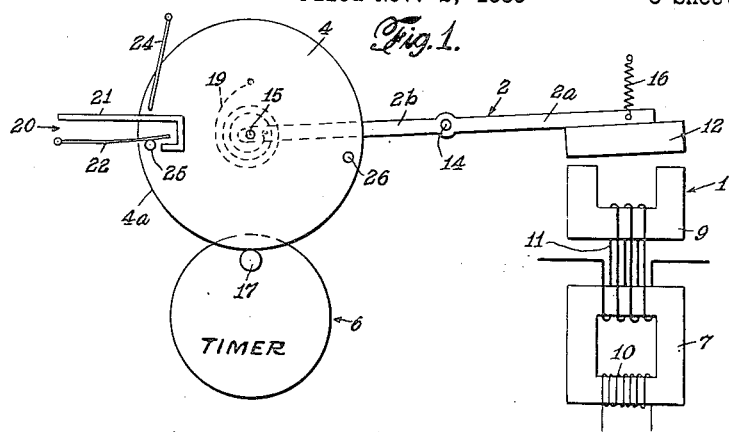
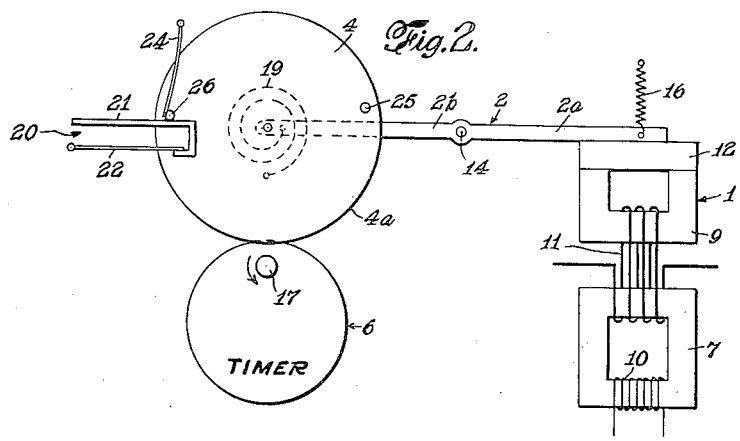
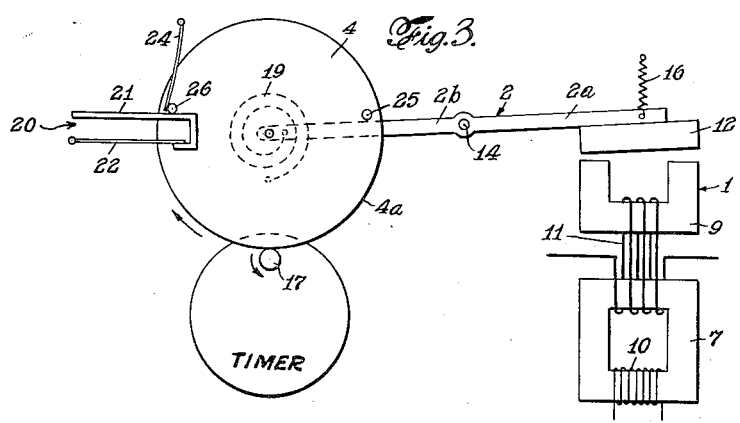
INVENTOR.
Joseph Tyrner
BY Williams, Rich & Morse
ATTORNEYS.

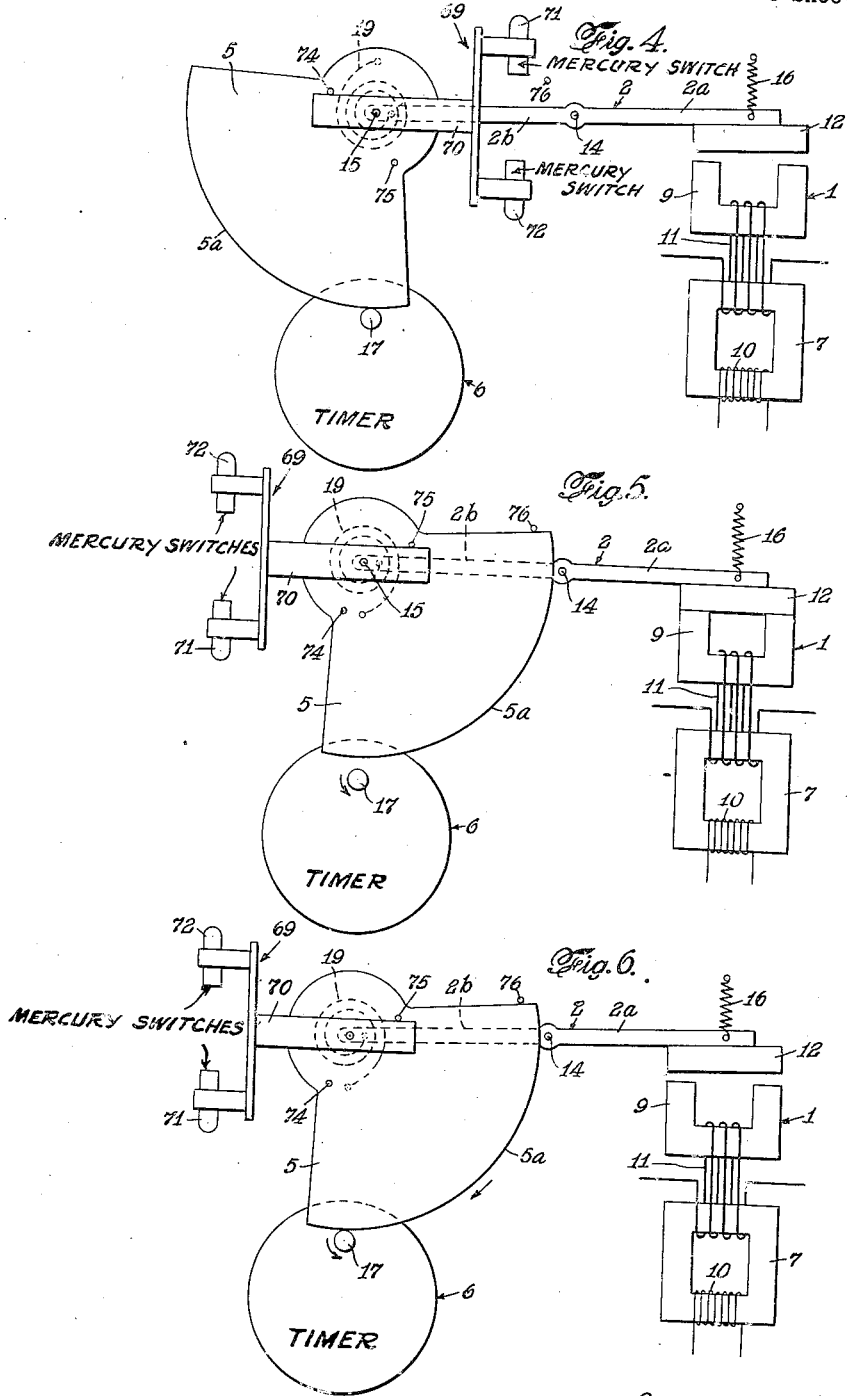

April 8, 1941.   J. TYRNER   2,237,894
AUTOMATIC CONTROL APPARATUS FOR DIRECT-CURRENT ARC WELDING
Filed Nov. 2, 1939   6 Sheets-Sheet 3

INVENTOR.
Joseph Tyrner
BY Williams, Rich & Morse
ATTORNEYS

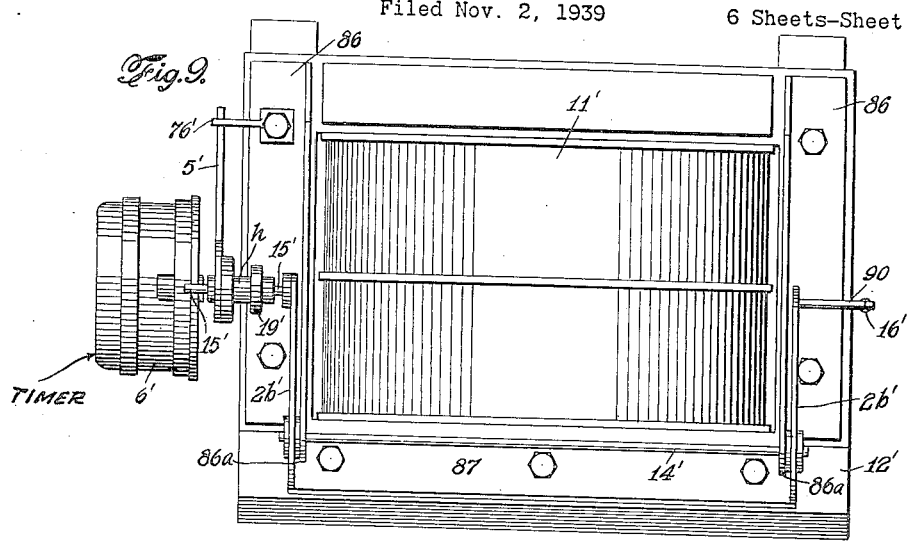
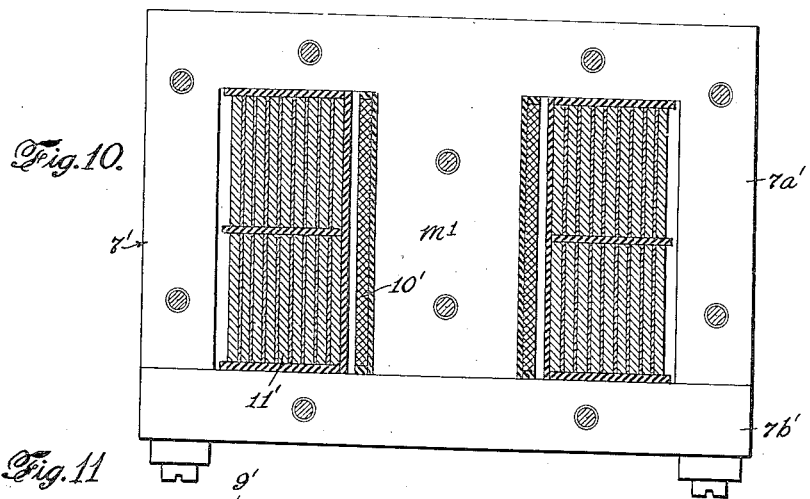
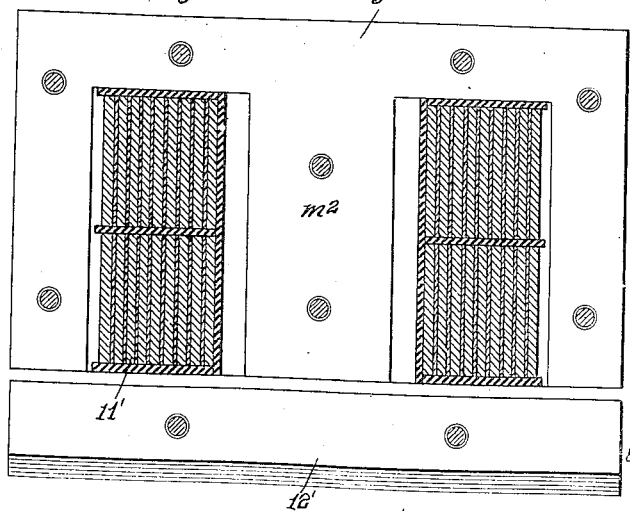
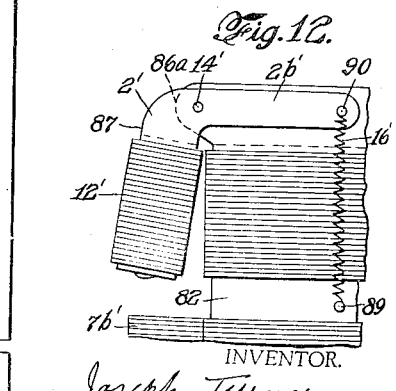

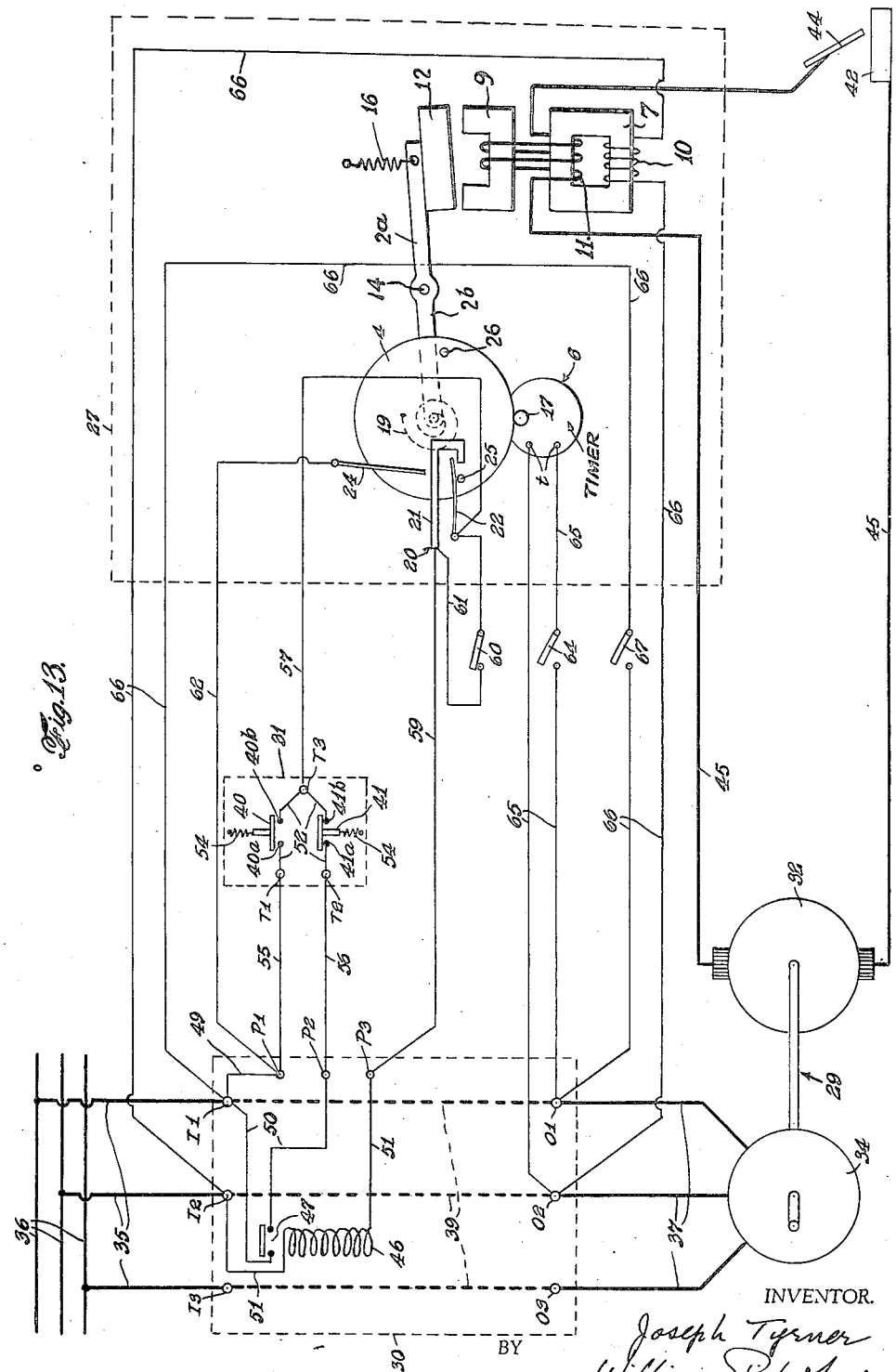

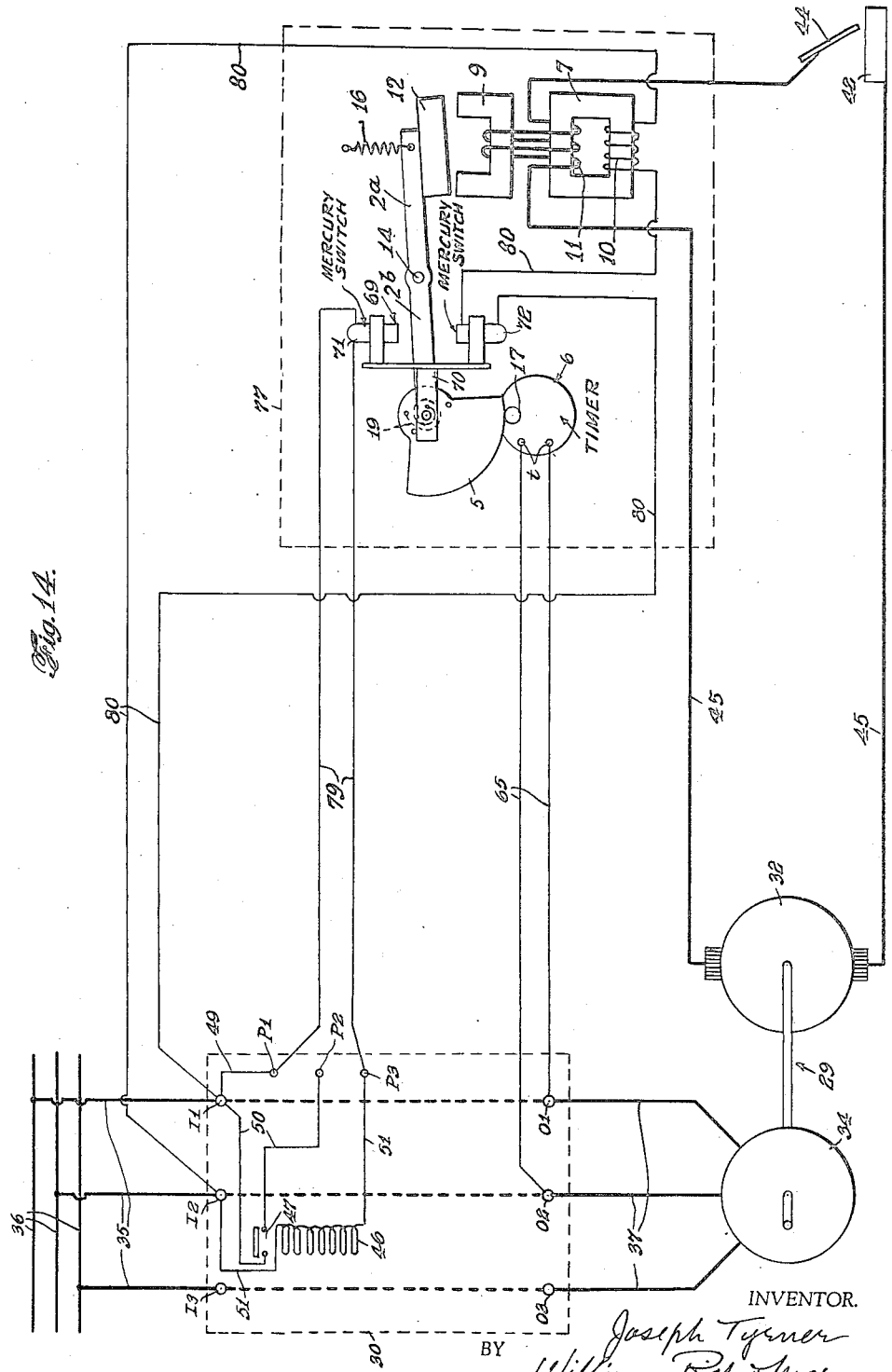

Patented Apr. 8, 1941

2,237,894

UNITED STATES PATENT OFFICE 2,237,894

AUTOMATIC CONTROL APPARATUS FOR DIRECT-CURRENT ARC WELDING

Joseph Tyrner, Englewood, N. J., assignor to Air Reduction Company, Incorporated, New York, N. Y., a corporation of New York Application November 2, 1939, Serial No. 302,515

6 Claims. (Cl. 171—123)

The present invention relates to the art of direct-current arc welding and has particular reference to an improved automatic control apparatus for use in that art.

Wherever welding is carried out at points remote from the motor-generator unit, as in the case of shipyard and structural work, boiler and tank shops, pipe lines, steel mill work, etc., a definite and substantial saving in time is effected by the use of control apparatus which automatically starts such unit running at the beginning of a welding operation and automatically stops it when welding is interrupted. Such control apparatus should operate in response to circuit establishment at the work for starting purposes, and in response to circuit interruption at the work for stopping purposes. However, whereas it should cause the motor-generator unit to start running practically at the same instant contact is made between work and welding electrode with the view to drawing the arc, it should operate to stop such unit with a certain time lag upon completion of the welding operation. This time lag, which may for example be from thirty to a hundred and twenty seconds, is necessary in practice to insure that the motor-generator unit be kept running through the usual circuit interruptions at the work during welding.

The fundamental object of the invention is to provide an automatic control apparatus of the character mentioned, which is simple in construction and reliable in operation.

Generally stated, the invention contemplates the use, in association with the direct-current arc welding circuit and the motor-generator unit supplying the direct current to such circuit, of an automatic control apparatus comprising a transformer-relay unit operatively associated with simple elements including a rotary member normally biased for rotational release from its normal position, an electric timing device for effecting a timed rotation of the rotary member back to its normal position, and switching means operated by the rotary member. The transformer-relay unit comprises transformer and relay cores, a transformer secondary and relay winding embracing both of such cores, a transformer primary embracing the transformer core alone, and a retractable armature cooperating with the relay core. The transformer secondary and relay winding is connected in the welding circuit, the closing of which permits the transformer primary to energize the transformer secondary and relay winding. The electric timing device has a normally stationary rotary shaft positioned to normally engage the rotary member, which is appropriately connected mechanically with the retractable armature to effect its disengagement from such shaft upon armature attraction by the relay core and its engagement with such shaft upon retraction of the armature. Both the motor-generator unit and the electric timing device have their operation controlled by the switching means, which are actuated by the rotational movements of the rotary member from and back to its normal position.

Figure 8:
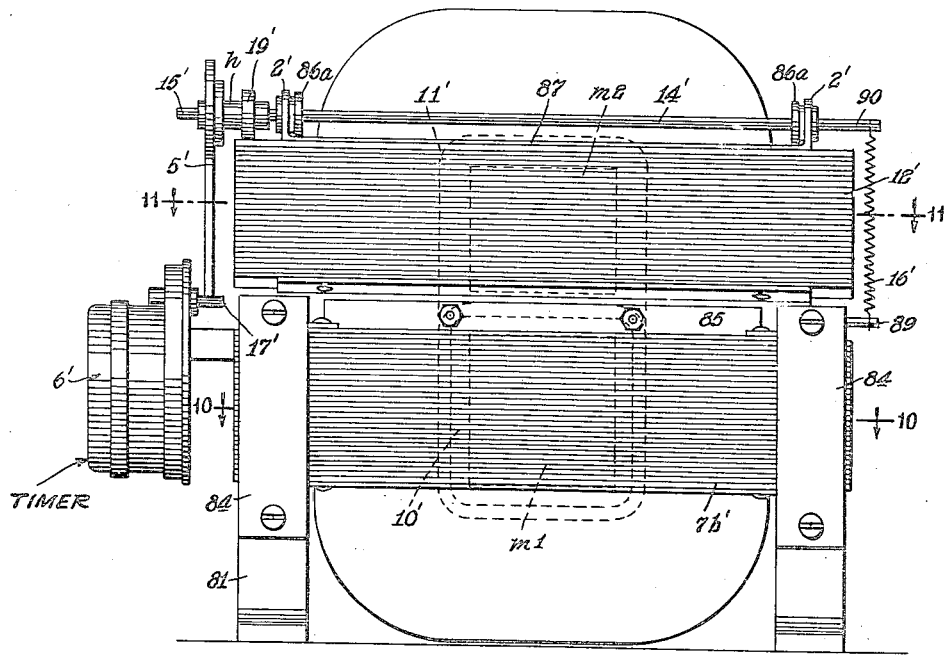

The invention will be understood from the following description taken in conjunction with the accompanying drawings in which Figs. 1 to 3 are schematic views of a form of apparatus embodying the invention showing three different positions of its movable parts; Figs. 4 to 6 are similar views of another form which differs from the preceding with respect to its switching means; Fig. 7 is a side elevation of a practical embodiment of the invention with switching means omitted; Figs. 8 and 9 are respectively front and plan views of the latter embodiment; Figs. 10 and 11 are respectively horizontal sections taken on the lines 10—10 and 11—11 of Fig. 8; Fig. 12 is a fragmentary view more clearly illustrating certain details shown in Figs. 8 and 9; and Figs. 13 and 14 are wiring diagrams having reference respectively to the switching means of Figs. 1 to 3 and to the switching means of Figs. 4 to 6.

Similar characters refer to similar parts throughout the various figures.

Referring to Figs. 1 to 6, the two forms of control apparatus illustrated in these figures are seen to comprise common elements inclusive of a transformer-relay unit generally indicated by the numeral 1, a lever generally indicated by the numeral 2, a rotary member shown as a disc 4 in the apparatus of Figs. 1 to 3 and as a sector 5 in the apparatus of Figs. 4 to 6, and an electric timing device generally indicated by the numeral 6. The transformer-relay unit 1 comprises a transformer core 7, a relay core 9, and two windings 10 and 11. The winding 10 is carried by the transformer core 7 alone and functions as a transformer primary, while the winding 11 is wound to embrace both the transformer core 7 and the relay core 9 and therefore serves both as a transformer secondary and as the magnetizing winding for the relay core 9. Also included in the transformer-relay unit 1 is an armature 12 which cooperates with the relay core 9. The lever 2 is of the type having two pivotal arms 2a and 2b on either side of its fulcrum or supporting shaft 14. On one arm 2a is carried the armature 12, while on the other arm 2b is carried a stub shaft or pin 15 on which is pivotally mounted the disc 4 in the apparatus of Figs. 1 to 3 and the sector 5 in the apparatus of Figs. 4 to 6. A spring 16 additionally included as a common element retracts the armature 12 from its position of engagement with the relay core 9. As shown, the electric timing device 6 has a shaft 17 positioned to rotationally engage the disc edge 4a in the apparatus of Figs. 1 to 3 and the sector edge 5a in the apparatus of Figs. 4 to 6 upon such armature retraction.

A further element common to the two forms of control apparatus illustrated in Figs. 1 to 6 is a second spring 19 for rotational release of the rotary member of either apparatus from its normal position of rest on the lever 2. Appropriate means hereinafter described are employed in each apparatus for checking this rotary member release by the spring 19, which takes places simultaneously with the pulling down of the armature 12 into its position of engagement with the relay core 9, by which armature movement the rotative edge of the rotary member in either apparatus is lifted out of engagement with the shaft 17. Thus, coincident with attraction of the armature 12 by the relay core 9 is an actuation by the spring 19 in the apparatus of Figs. 1 to 3 of the disc 4 from its position of Fig. 1 to its position of Fig. 2 and in the apparatus of Figs. 4 to 6 of the sector 5 from its position of Fig. 4 to its position of Fig. 5. Subsequent retraction of the armature 12 by the spring 16 effects a lowering in the apparatus of Figs. 1 to 3 of the disc 4 into its position of Fig. 3 and in the apparatus of Figs. 4 to 6 of the sector 4 into its position of Fig. 6. At this moment the spring 16 is effective in pressing the disc edge 4a in the apparatus of Figs. 1 to 3 and the sector edge 5a in the apparatus of Figs. 4 to 6 against the shaft 17, which thus enables such shaft to rotate the rotary member of either apparatus back to its normal position of rest on the lever 2, the disc 4 in the apparatus of Figs. 1 to 3 being returned to its position of Fig. 1 and the sector 5 in the apparatus of Figs. 4 to 6 to its position of Fig. 4. This rotation of the rotary member of either apparatus by the shaft 17 stores energy in the spring 19, which is thus made ready to effect its own rotary member release in immediate response to armature attraction by the relay core 9, as already explained.

It is the function of the rotary member in apparatus of this invention to actuate in turn appropriate switching means by its rotational movements. Such switching means have for their main purpose to afford circuit control of the motor included in the motor-generator unit used for welding and circuit control of the motor included in the electric timing device, these two motors being started as a result of the rotational movement of the rotary member from its normal position and stopped as a result of the rotational movement of the rotary member to its normal position. Another purpose is to afford such circuit control of the primary winding included in the transformer-relay unit as to cause it to be de-energized as a result of the rotational movement of the rotary member from its normal position and energized as a result of the rotational movement of the rotary member to its normal position, although this particular control should not be regarded as an actual requirement of the invention, but merely as a desirable feature from a practical standpoint, as will hereinafter be explained. It is evident that there are various ways of arriving at these circuit controls, each of the two forms of control apparatus illustrated in Figs. 1 to 6 being different in regard to the form of switching means used in association with its rotary member.

In accordance with the preferred practice of the invention, the switching means used to cooperate with the rotary member should at least control the operation of the motor-generator unit through the usual magnetic starter included in welding equipment. As will hereinafter more particularly appear in connection with the diagrams of Figs. 13 and 14, both the operation of the motor-generator unit and the operation of the electric timing device are controlled in this manner by each of the two switching means peculiar to the two forms of apparatus illustrated in Figs. 1 to 6. The switching means of Figs. 1 to 3 also make use of such starter in controlling the energization of the transformer primary, while the switching means of Figs. 4 to 6 are capable of effecting this control with or without the assistance of such starter, a separate switch effecting it alone being included in the switching means of Figs. 4 to 6 for the purpose of illustrating this possibility. As will hereinafter become apparent, the manner in which control of the energization of the transformer primary is effected depends on its circuit connections, each of the two switching means peculiar to the two forms of control apparatus illustrated in Figs. 1 to 6 being of a type adapting it to effect the various controls in conjunction with the usual magnetic starter, if desired.

Each of the two forms of control apparatus illustrated in Figs. 1 to 6 will now be separately described.

Referring to Figs. 1 to 3, the switching means generally indicated by the numeral 20 in these figures comprise a fixed contact 21 and two movable contacts 22 and 24 adapted to cooperate with the fixed contact 21. In operation, these three contacts substantially duplicate those of the usual push-button device employed with the aforementioned magnetic starter, as will hereinafter become apparent. Two pins 25 and 26 are provided on the disc 4. Pin 25 normally holds the movable contact 22 out of engagement with the fixed contact 21 (Fig. 1), but allows these two contacts to close practically instantaneously by its rotation with the disc 4 under the action of the spring 19. Pin 26 checks this rotational release of the disc 4 by its engagement with the fixed contact 21 and at the same time connects the fixed contact 21 to the movable contact 24 by its common engagement with these contacts (Fig. 2). Armature attraction by the relay core 9 thus effects connection of the fixed contact 21 with each of the movable contacts 22 and 24. Subsequent armature retraction by the spring 16 has itself no influence on either of these connections (Fig. 3), but the rotation of the disc 4 by the timing device shaft 17 initially interrupts the connection of the fixed contact 21 with the movable contact 24 by causing the pin 26 to move out of its contact-making position of engagement with the fixed contact 21 and finally interrupts the connection of the fixed contact 21 with the movable contact 22 by causing the pin 25 to move into its contact-breaking position of engagement with the movable contact 22, each pin being restored by this timed rotation of the disc 4 to its normal position (Fig. 1). While the disc 4 is shown as carrying two pins 25 and 26, it is evident that a single pin can be used to accomplish each of their purposes, if desired.

Referring now to Fig. 13, the rectangle 27 indicates the control apparatus of Figs. 1 to 3, which is shown associated with standard welding equipment including a motor-generator unit generally indicated by the numeral 28, a magnetic starter indicated by the rectangle 30, and a push-button device indicated by the rectangle 31. The usual direct-current generator 32 for supplying the welding current and a 3-phase motor 34 for driving such generator are shown as comprising the unit 28. Operation of the unit 28 is controlled through the starter 30, which for this purpose has three input terminals I1 to I3 connected by conductors 35 to a 3-phase alternating-current supply 36 and three output terminals O1 to O3 connected by conductors 37 to the motor 34, the usual magnetically controlled circuit connections between these input and output terminals of the starter 30 being schematically represented by the dotted lines 39. The device 31 has a start button 40 and a stop button 41, which serve through their respective controlling effects on the starter connections 39 to start and stop the unit 28, as will hereinafter be more particularly described. The welding circuit supplied with current from the generator 32 includes the work 42 and the welding electrode 44 thereon, the usual conductors 45 being shown connecting these elements to the generator terminals.

The starter 30 includes three pilot circuit terminals P1 to P3. It further includes a holding coil 46 and an interlock 47. Both the circuit connections 39 and the interlock 47 are magnetically controlled by the coil 46, which establishes such connections and closes the interlock 47, when it is energized, and interrupts such connections and opens the interlock 47, when it is deenergized. As shown, one input terminal I1 leads directly by a conductor 49 to one pilot circuit terminal P1. Conductors 50 connect the interlock 47 between the same input terminal I1 and a second pilot circuit terminal P2, while conductors 51 connect the holding coil 46 between a second input terminal I2 and the third pilot circuit terminal P3.

The device 31 has three terminals indicated by T1 to T3. The start button 40 cooperates with contacts 40a and 40b, which are normally open. The stop button 41 cooperates with contacts 41a and 41b, which are normally closed. As made clear by the conductors 52, two terminals T1 and T2 are respectively connected to one start-button-contact 40a and to one stop-button-contact 41a, while the third terminal T3 is connected to both the second start-button-contact 40b and the second stop-button-contact 41b. It is understood that the two buttons 40 and 41 are of the type adapted when released by the operator to be retracted to their normal positions, as schematically represented by the springs 54.

Still referring to Fig. 13, the terminals P1 and P2 are respectively connected by conductors 55 and 56 to the terminals T1 and T2, the terminal T3 is connected by a conductor 57 to the movable contact 22, and the fixed contact 21 is connected by a conductor 58 to the terminal P3. In the absence of the automatic control apparatus 27, a direct connection would, according to standard practice, be provided between the terminals T3 and P3. A switch 60 connected by conductors 61 across the normally open contacts 21 and 22 of such apparatus is thus seen to be included as an accessory in the wiring diagram of Fig. 13 to enable obtaining this connection for normal operation of the push-button device 31. With the switch 60 closed, the holding coil 46 is energized by pressing the start button 40, which connects such coil through the closed contacts 40a and 40b of such button across the input terminals I1 and I2 (and hence across one phase of the current supply 36). Since this energization of the coil 46 results in a closing of the interlock 47, such coil is further connected across the same terminals I1 and I2 through the normally closed stop-button-contacts 41a and 41b, which prevents its deenergization upon release of the button 40. The coil 46 thus remains energized until the stop button 41 is depressed, at which moment it is obviously deenergized by an opening of the contacts 41a and 41b of such button, the opening of the interlock 47 accompanying this deenergization preventing its reenergization upon release of the button 41 and keeping it deenergized until the start button is again depressed. Since the coil 46 by its energization and deenergization functions respectively to establish and interrupt the circuit connections 39, it is clear that the push-button device 31 can be operated in the usual manner to close or open the starter 30 and thus control the operation of the motor-generator unit 28, if the switch 60 is kept closed.

On the other hand, the switching means 20 are adapted to effect their automatic control of the operation of the unit 28, with the switch 60 open. Also included in the connections of such means is a conductor 62 connecting the movable contact 24 to the terminal P1. Rotational release of the disc 4 under the action of the spring 10 energizes the coil 46 by connecting it through the contacts 21 and 24 across the input terminals I1 and I2 (and hence across one phase of the current supply 36), which contacts are closed incident to such release by the action of the pin 26. The closing of the interlock 47 caused by this energization also connects the coil 46 across the same terminals I1 and I2 through the contacts 21 and 22, which are closed by the action of the pin 26 at the very start of the rotation by the spring 10, and through the stop-button-contacts 41a and 41b, which remain closed throughout the operation of the automatic control apparatus 27. Therefore, the coil 46 is prevented from deenergizing when the contacts 21 and 24 are opened by the action of the pin 26 incident to the rotation of the disc 4 by the shaft 17. It is maintained energized until the disc 4 by this rotation is returned to its normal position, at which moment it is obviously deenergized by an opening of the contacts 21 and 22 by the action of the pin 26, the opening of the interlock 47 caused by this deenergization insuring against its being reenergized by any possible closing of the contacts 21 and 22 before the disc 4 is again rotationally released by the spring 10. Since the coil 46 by its energization and deenergization respectively functions to establish and interrupt the circuit connections 39, it is clear that the switching means 20 effect automatic control of the operation of the starter 30 and hence the desired automatic control therethrough of the operation of the unit 28, if the switch 60 is kept open.

A second switch 64 is included as an accessory in the wiring diagram of Fig. 13 to render the electric timing device 6 capable or incapable of operation, as desired. Conductors 65 connect the motor terminals of the device 6 in a series circuit with the switch 64 across two starter output terminals O1 and O2. By these connections, with the switch 64 closed, operation of the device 6 is obviously controlled by the starter 30 which, when closed, connects it across the input terminals I1 and I2, (and hence across one phase of the current supply 36) and, when open, disconnects it from the same terminals I1 and I2. From this it is apparent that the switching means 20 by their automatic control of the starter 30 effect the desired automatic control of the operation of the device 6, with the switch 60 open, the device 6 being operated simultaneously with the motor-generator unit 29. The usual control of the operation of such unit by the push-button device 31 is effected with the switch 64 open, which permits such control without operating the electric timing device 6.

The connections of the transformer primary 10 according to the diagram of Fig. 13 are provided by conductors 66 connecting one starter input terminal I1 directly to the corresponding output terminal O1 and a second input terminal I2 through such primary to the corresponding output terminal O2, a third switch 67 connected in one of these conductors being included as an accessory in such diagram to render the transformer primary 10 capable or incapable of energization, as desired. By the conductors 66, it is apparent that the transformer primary 10 is adapted to be parallelly connected with one of the starter connections 39 in a series circuit through the driving motor 34 (i. e., one of the phases of its stator winding) across the input terminals I1 and I2 (and hence across one phase of the current supply 36), with the switch 67 closed. When the starter is open, the transformer primary 10 is obviously energized in this series circuit, the small current required to effect its energization (as a result of its high impedance) having no effect on the motor 34. On the other hand, when the starter 10 is closed, the transformer primary 10 is deenergized by reason of short-circuit through its parallelly connected circuit connection 39. In view of this control of the energization of the transformer primary 10 by the starter 30, it is clear that the switching means 20 by their automatic control of such starter effect the desired automatic control of such energization, with the switch 60 open, such primary being deenergized when the motor-generator unit 29 and the electric timing device 6 are operated and energized when such unit 29 and device 6 are at rest. The usual control of the operation of the unit 29 by the push-button device 31 is effected with the switch 67 open, which permits such control without energizing the transformer primary 10.

It should here be noted that the wiring diagram of Fig. 13 is not one to be regarded as illustrating the simplest connections to be used in practice. For example, the conductor 66 leading from the starter input terminal I1 may be directly connected to that timing device terminal t which is connected through the switch 64 to the starter output terminal O1, in which event the switch 67 would be omitted and the switch 64 would serve both its own specific purpose and the purpose of the omitted switch 67. Furthermore, it is possible to operate the apparatus 27 without the push-button device 31, in which event the conductor 57 would be directly connected to the starter pilot terminal P2 and the three switches 60, 64 and 67 omitted. The wiring diagram of Fig. 13 is designed so as to clearly outline the individual circuits necessary for proper operation of the apparatus 27 in association with the usual elements of standard welding equipment.

In accordance with the invention, the transformer secondary and relay winding 11 is connected in the welding circuit, as illustrated by the conductors 45.

The novel manner in which the automatic control apparatus illustrated in Figs. 1 to 3 operates will now be more fully described in connection with the schematic views of these figures and with the wiring diagram of Fig. 13, it being assumed in this description that the switch 60 is kept open and the switches 64 and 67 are kept closed at all times.

Fig. 1 shows the apparatus 27 (Fig. 13) in the normal position of its movable parts. The transformer primary 10 is energized, since the starter 30 is open. Let it be assumed that a welding operation is to be carried out at the work 42. The operator contacts the welding electrode 44 with the work 42, which closes the welding circuit. Current is thus induced by the transformer primary 10 in the transformer secondary and relay winding 11, which magnetizes the relay core 9. Fig. 2 shows the apparatus 27 in the position into which its movable parts are moved at this moment, the armature 12 being attracted into engagement with the relay core 9 simultaneously with a rotational release of the disc 4 by the spring 19, resulting in an actuation of the switching means 20 connecting the fixed contact 21 to each of the movable contacts 22 and 24. This closes the starter 30, which starts the motor-generator unit 29 running. All this is effected practically at the instant when the welding circuit is closed by the operator, so that current from the generator 32 for drawing the arc and starting the welding operation is available to the operator in the comparatively short period required for the motor-generator unit 29 to gather speed. The closing of the starter 30 further starts the electric timing device 6 and deenergizes the transformer primary 10, but the direct-current flow from the generator 32 energizes the winding 11 during the welding operation, which is thus carried out with the armature 12 in engagement with the relay core 9 and the disc 4 out of engagement with the rotating shaft 17. It is clear that the apparatus 27 is maintained in the position of its movable parts shown in Fig. 2 throughout the period required to complete the welding operation.

When the welding operation is completed, the welding circuit is opened by the breaking of the arc between the work 42 and welding electrode 44. The relay core 9 is demagnetized by deenergization of the winding 11. Fig. 3 shows the apparatus 27 in the position into which its movable parts are moved at this moment, the electric timing device 6 being now effective in rotating the disc 4 because of retraction of the armature 12 by the spring 16. The opening of the contacts 21 and 24 has no effect on the starter 30 at the start of this rotation, but combined with the ultimate opening of the contacts 21 and 22 opens the starter 30. This stops the motor-generator unit 29. It also stops the electric timing device 6, at which moment the apparatus 27 is again in the normal position of its movable parts shown in Fig. 1. It further reenergizes the transformer primary 10, which is thus prepared to react inductively with the winding 11 in response to another welding demand upon the generator 32.

If for any reason whatever the welding circuit is broken before a welding operation is completed, the apparatus 27 at once assumes the position of its movable parts shown in Fig. 3, but its transition to the position of Fig. 1 is timed because of the rotation of the disc 4 by the shaft 17. The stopping of the motor-generator unit 29 is thus delayed by the period required for the disc 4 to rotate from its position of Fig. 3 to its position of Fig. 1, which enables the operator to readily restore the welding arc at any time before completion of this rotation. Whenever welding is thus interrupted and resumed, the reenergization of the winding 11 caused by the closing of the welding circuit results in a practically instantaneous return of the apparatus 27 to the position of its movable parts shown in Fig. 2, the disc 4 being reversely actuated by the spring 19 from the position reached by rotative association with the electric timing device during welding interruption. This means that the stopping of the motor-generator unit 29 is delayed on each occasion of welding interruption for the same period, which is the time required for the rotation of the disc 4 from its position of Fig. 3 to its position of Fig. 1. This period may obviously be of any predetermined duration and depends cn such factors as the speed of the electric timing device 6, the ratio of the radius of the shaft 17 to the radius of the disc 4, and the angular distance between the pins 25 and 26.

In using the apparatus 27 to carry out a welding operation, it should be noted that the operator will in general simply contact the welding electrode with the work momentarily so as to effect the closing of the starter 30, after which he will allow sufficient time for the motor-generator unit to gather speed, whereupon he will again contact the welding electrode with the work for the purpose of drawing the welding arc. The armature 12 will be retracted by the spring 16 and the disc 4 rotated by the device 6 following the initial momentary closing of the welding circuit, but it is clear from the foregoing description that the apparatus 27 will at once be caused to assume its welding position of Fig. 2 by the subsequent closing of the welding circuit to start the welding operation, the rotation of the disc 4 during the comparatively short period the welding circuit is permitted to remain open by the operator being obviously insufficient to stop the motor-generator unit. Of course, the operator may, if he chooses, leave the welding electrode in contact with the work during the period allowed for the motor-generator unit to gather speed, but in this case he must exercise proper judgment regarding the length of such period to prevent sticking of the welding electrode to the work, which if allowed to occur would obviously make the drawing of the arc more or less troublesome. The use of the apparatus 27 in the latter manner retains it in the welding position of Fig. 2 through the allowed period of welding electrode contact with the work preceding the welding operation, as is evident from the fact that only a fraction of the final value of the current supplied through the winding 11 from the generator is sufficient to hold the armature 12 in engagement with the relay core 9, the brief period required for this condition to be attained in the welding circuit being more than compensated by such factors as the time taken by the transformer primary 10 to deenergize following the closing of the starter 30.

Referring to Figs. 4 to 6, the sector 5 is seen to be rotatively associated with gravity-drop switching means generally indicated by the numeral 69. Included in these means is a bracket 70 pivotally mounted with the sector 5 on the lever pin 15, but free to move independently of the sector 5. Carried by the bracket 70 are two mercury switches 71 and 72, with respect to which two pins 74 and 75, cooperating with the bracket 70, are suitably positioned on the sector 5. A separate stop 76 is provided to cooperate with the sector 5 in checking its rotation by the spring 19, which rotation thus causes the switching means 69 to be rotated (relatively to the sector 5) from their position of Fig. 4 first by the pin 74 and thereafter by gravity to their position of Fig. 5, in which they are maintained by the pin 75. On the other hand, the sector rotation by the shaft 17 causes the switching means 69 to be rotated from their position of Fig. 6 first by the pin 75 and thereafter by gravity to their position of Fig. 4, in which they are maintained by the pin 74. Each of these rotational movements of the switching means 69 is effective in actuating each of the two mercury switches 71 and 72, as will hereinafter be more particularly described.

Referring now to Fig. 14, the rectangle 77 indicates the apparatus of Figs. 4 to 6, which in this instance is shown associated with the heretofore described elements of standard welding equipment exclusive of the push-button device. One mercury switch 71 is normally open and is connected by conductors 79 across the starter pilot terminals P1 and P3, while the second mercury switch 72 is normally closed and is connected by conductors 80 in a series circuit with the transformer primary 10 across the starter input terminals I1 and I2. As before, the conductors 65 connect the timing device terminals t across the starter output terminals O1 and O2. The switch 71 is obviously adapted by its connections to control the energization of the holding coil 46, from which it is apparent that it effects both a control of the operation of the motor-generator unit 29 and a control of the operation of the electric timing device 6 through the starter 30. On the other hand, the switch 72 is adapted to function alone in effecting a direct control of the energization of the transformer primary 10. The transformer secondary and relay winding 11 is again shown connected in the welding circuit, as required by the invention.

Fig. 4 shows the normal position of the switching means 69. The starter 30 is open and the transformer primary 10 is energized, since the switches 71 and 72 are open and closed, respectively. A closing of the welding circuit energizes the transformer secondary and relay winding 11 with a resulting armature attraction by the relay core 9 and a practically instantaneous rotation of the switching means 69 under the influence of the sector release by the spring 19 into their position of Fig. 5. This closes the switch 71 and opens the switch 72, the closing of the switch 71 closing the starter 30. The unit 29 and the device 6 are started, while the transformer primary 10 is deenergized, the generator 32 now becoming the source depended upon to energize the winding 11 with the welding circuit closed, as in the case of the apparatus of Fig. 13. Any opening of the welding circuit with resulting armature retraction by the spring 16 will effect a lowering of the switching means 69 into their position of Fig. 6, which will thus cause them to be rotated from this position under the influence of the sector rotation by the shaft 17. However, there will be no actuating effect on the switches 71 and 72 unless the opening of the welding circuit is unduly prolonged, the reestablishment of the switching means 69 to their position of Fig. 5 by subsequent closing of the welding circuit being possible at any time prior to their eventual drop into their position of Fig. 4. This opens the switch 71 and closes the switch 72, the opening of the switch 71 opening the starter 30. The unit 29 and the device 6 are stopped, while the transformer primary 10 is reenergized.

From the foregoing description it is clear that each of the two forms of automatic control apparatus illustrated in Figs. 1 to 6 is fundamentally characterized by the same operating features. If desired, the transformer primary 10 could obviously be connected for use in the apparatus of Figs. 4 to 6 in the same manner as it is shown connected (in the wiring diagram of Fig. 13) for use in the apparatus of Figs. 1 to 3, in which event the switch 71 would cooperate with the starter 30 in controlling its energization and the switch 72 would be omitted as unnecessary. Furthermore, the usual push-button device could also be associated with the apparatus of Figs. 4 to 6, as is evident to those skilled in the art.

It has already been mentioned that a control of the energization of the transformer primary is not actually required in apparatus of this invention. In the absence of this control, however, the transformer primary (then permanently connected to the current supply) must be made of much heavier wire or even operated with resistance in order to withstand the increased flow of alternating current from the current supply during the period of welding current flow in the transformer secondary and relay winding, as caused by saturation in the transformer core. From a practical standpoint, therefore, a control of the energization of the transformer primary is desirable.

Referring to Figs. 7 to 12, a unitary structure embodying the invention is shown comprising a shell-type transformer core 7' horizontally secured to suitable base members 81. As best shown in Fig. 10, the transformer core 7' may conveniently be made in two separate parts, namely, an E-shaped part 7a' and a bar-like part 7b'. Adapted to overlie the E-shaped part 7a' by means of suitable spacers 82 is an E-shaped relay core 9', which may be retained in position through such spacers, it being understood that the relay core 9' should be so dimensioned and positioned as to cause it to register perpendicularly with the transformer core part 7a', as made clear by the horizontal sections of Figs. 10 and 11. The character $m1$ (Figs. 8 and 10) has reference to the middle leg of the transformer core part 7a', while the character $m2$ (Figs. 8 and 11) has reference to the middle leg of the relay core 9'. As best shown in Figs. 10 and 11, two windings 10' and 11' respectively surround the middle legs $m1$ and $m2$. The inner winding 10' is a transformer primary made to embrace only the middle leg $m1$, while the outer winding 11' is a transformer secondary and relay winding made to embrace both of the middle legs $m1$ and $m2$. The making of the transformer core 7' in the two parts 7a' and 7b' makes possible the positioning of the two windings 10' and 11' as described, such transformer core parts being thereafter permanently secured to one another by suitable clamping means 84. Other clamping means 85 may be used to securely hold the transformer secondary and relay winding 11' in place. Parallelly extending angle members 86 may be used on the upper surface of the outer legs of the relay core 9' for greater rigidity of the unitary structure shown.

Referring to Figs. 7 to 9, the relay core 9' is seen to cooperate with a bar-like armature 12'. This armature is secured to the base portion of a U-like carrier 87 whose end portions are shaped to provide bell-crank levers 2'. These levers are respectively mounted on the outer end portions of a horizontal shaft 14', which may be fixedly secured through forward extensions 86a formed on the vertical flanges of the angle members 86. As will appear in the description following, the two levers 2' have the same function together as the single lever 2 of Figs. 1 to 6.

Still referring to Figs. 7 to 9, the armature 12' cooperates on one side of the transformer-relay unit with a rotary member 5', which in turn cooperates with an electric timing device 6' appropriately secured to such apparatus side, the member 5' being provided with a suitable hub $h$ by means of which it is pivotally fitted on a pin 18' extending laterally from the rearwardly extending arm $2b'$ of one of the levers 2'. On the other side of the transformer-relay unit, a fixed pin 89 is provided serving as an anchor for the lower end of a tension spring 16', the upper end of which is attached to a pin 90 extending laterally from the rearwardly extending arm $2b'$ of the other of the levers 2' (see Fig. 12). The spring 16' thus functions through this one of the levers 2' to restore the armature 12' to its normal position away from the relay core 9' and through each of the levers 2' to lower the member 5' into its operative position of rotational engagement with the timing device shaft 17'. As best shown in Fig. 7, the member 5' is rotationally released from its inoperative position of engagement with the timing device shaft 17' by a volute spring 10' having its inner end anchored to the hub $h$ and its outer end anchored to the top of the transformer relay unit. A suitable stop 76' secured to such top checks such release.

Although no switching means are shown to be associated with the rotary member 5' in the unitary structure of Figs. 7 to 12, it is evident that any one of various forms can be used adapted to cooperate with such member in effecting the circuit controls heretofore described in connection with the schematic views of Figs. 1 to 6.

The relative position of the rectangle 27 in Fig. 13 and of the rectangle 77 in Fig. 14 has reference to no particular point of connection of the control means of the invention in the welding circuit, it being understood that such control means would in practice be installed with the rest of the accessories close to the motor-generator unit.

It is to be understood that the invention is not to be limited to the illustrative embodiments herein particularly described, but may be carried out in other ways within the purview of the claims.

What is claimed is:

1. The combination with a direct-current arc welding circuit and a motor-generator unit for supplying the direct current to said circuit, of an automatic control apparatus comprising transformer and relay cores, a transformer secondary and relay winding embracing both of said cores, said transformer secondary and relay winding being connected in said circuit, a transformer primary embracing the transformer core alone for energizing said transformer secondary and relay winding upon closing of said circuit, a retractable armature cooperating with the relay core, a rotary member normally biased for rotation from its normal position, an electric timing device for rotationally restoring said member to its normal position, said device having a normally stationary rotary shaft normally engaging said member, mechanical means operatively connecting said member with said armature to effect movement of said member out of engagement with said shaft upon attraction of said armature by the relay core and movement of said member into engagement with said shaft upon retraction of said armature, and switching means operated by said member for controlling the operation of said unit and the operation of said device, said switching means being actuated by the rotational movements of said member from and back to its normal position.

2. The combination with a direct-current arc welding circuit and a motor-generator unit for supplying the direct current to said circuit, of an automatic control apparatus comprising transformer and relay cores, a transformer secondary and relay winding embracing both of said cores, said transformer secondary and relay winding being connected in said circuit, a normally energized transformer primary embracing the transformer core alone for energizing said transformer secondary and relay winding upon closing of said circuit, a retractable armature cooperating with the relay core, a rotary member normally biased for rotation from its normal position, an electric timing device for rotationally restoring said member to its normal position, said device having a normally stationary rotary shaft normally engaging said member, mechanical means operatively connecting said member with said armature to effect movement of said member out of engagement with said shaft upon attraction of the armature by the relay core and movement of said member into engagement with said shaft upon retraction of said armature, and switching means operated by said member for controlling the operation of said unit and the operation of said device and for controlling the energization of said transformer primary, said switching means being actuated to start said unit and said device and deenergize said transformer primary by rotational movement of said member from its normal position and to stop said unit and said device and energize said transformer primary by rotational movement of said member to its normal position.

3. The combination with a direct-current arc welding circuit, a motor-generator unit for supplying the direct current to said circuit, and a magnetic starter controlling the operation of said unit, of an automatic control apparatus comprising transformer and relay cores, a transformer secondary and relay winding embracing both of said cores, said transformer secondary and relay winding being connected in said circuit, a transformer primary embracing the transformer core alone for energizing said transformer secondary and relay winding upon closing of said circuit, a retractable armature cooperating with the relay core, a rotary member normally biased for rotation from its normal position, an electric timing device for rotationally restoring said member to its normal position, said device having a normally stationary rotary shaft normally engaging said member, mechanical means operatively connecting said member with said armature to effect movement of said member out of engagement with said shaft upon attraction of said armature by the relay core and movement of said member into engagement with said shaft upon retraction of said armature, said device being connected for control of its operation by said starter, and switching means operated by said member for controlling the operation of said starter, said switching means being actuated to close said starter by rotational movement of said member from its normal position and to open said starter by rotational movement of said member to its normal position.

4. The combination with a direct-current arc welding circuit, a motor-generator unit for supplying the direct current to said circuit, and a magnetic starter controlling the operation of said unit, of an automatic control apparatus comprising transformer and relay cores, a transformer secondary and relay winding embracing both of said cores, said transformer secondary and relay winding being connected in said circuit, a normally energized transformer primary embracing the transformer core alone for energizing said transformer secondary and relay winding upon closing of said circuit, a retractable armature cooperating with the relay core, a rotary member normally biased for rotation from its normal position, an electric timing device for rotationally restoring said member to its normal position, said device having a normally stationary rotary shaft normally engaging said member, mechanical means operatively connecting said member with said armature to effect movement of said member out of engagement with said shaft upon attraction of said armature by the relay core and movement of said member into engagement with said shaft upon retraction of said armature, said device being connected for control of its operation by said starter, and switching means operated by said member for controlling the operation of said starter and for controlling the energization of said transformer primary, said switching means being actuated to close said starter and deenergize said transformer primary by rotational movement of said member from its normal position and to open said starter and energize said transformer primary by rotational movement of said member to its normal position.

5. The combination with a direct-current arc welding circuit supplied with welding current from a direct-current generator, an alternating-current motor for driving said generator, an alternating-current source, and a magnetic starter connected between said motor and said source, of an automatic control apparatus comprising transformer and relay cores, a transformer secondary and relay winding embracing both of said cores, said transformer secondary and relay winding being connected to said circuit, a normally energized transformer primary embracing the transformer core alone for energizing said transformer secondary and relay winding upon closing of said circuit, a retractable armature cooperating with the relay core, a rotary member normally biased for rotation from its normal position, an electric timing device for rotationally restoring said member to its normal position said device having a normally stationary rotary shaft normally engaging said member, mechanical means operatively connecting said member with said armature to effect movement of said member out of engagement with said shaft upon attraction of said armature by the relay core and movement of said member into engagement with said shaft upon retraction of said armature, said transformer primary being parallelly connected with said starter through said motor to said source and said device being parallelly connected with said motor through said starter to said source, and switching means operated by said member for controlling the operation of said starter, said switching means being actuated to close said starter by rotational movement of said member from its normal position and to open said starter by rotational movement of said member to its normal position.

6. The combination with a direct-current arc-welding circuit and a motor-generator unit for supplying the direct current to said circuit, of an automatic control apparatus comprising transformer and relay cores, a transformer secondary and relay winding embracing both of said cores, said transformer secondary and relay winding being connected in the welding circuit, a transformer primary embracing the transformer core alone for energizing said transformer secondary and relay winding upon closing of said circuit, a retractable armature cooperating with the relay core, a rotary member normally biased for rotation from its normal position, an electric timing device for rotationally restoring said member to its normal position, said device having a normally stationary rotary shaft normally engaging said member, a lever having two pivotal arms on which said armature and said member are respectively fixedly and pivotally mounted, and switching means operated by said member for controlling the operation of said unit and the operation of said device, said switching means being actuated by the rotational movements of said member from and back to its normal position.

JOSEPH TYRNER.

CERTIFICATE OF CORRECTION.

Patent No. 2,237,894.　　　　　　　　　　　　　　　April 8, 1941.

JOSEPH TYRNER.

It is hereby certified that error appears in the printed specification of the above numbered patent requiring correction as follows: Page 7, second column, line 60, claim 5, for the word "to" read --in--; and that the said Letters Patent should be read with this correction therein that the same may conform to the record of the case in the Patent Office.

Signed and sealed this 13th day of May, A. D. 1941.

(Seal)　　　　　　　　　　　　　　　　　　　　　　　Henry Van Arsdale,
　　　　　　　　　　　　　　　　　　　　　　　Acting Commissioner of Patents.